July 12, 1966      E. R. POWELL      3,260,508
BALANCING HOIST
Filed Oct. 14, 1963      5 Sheets-Sheet 1
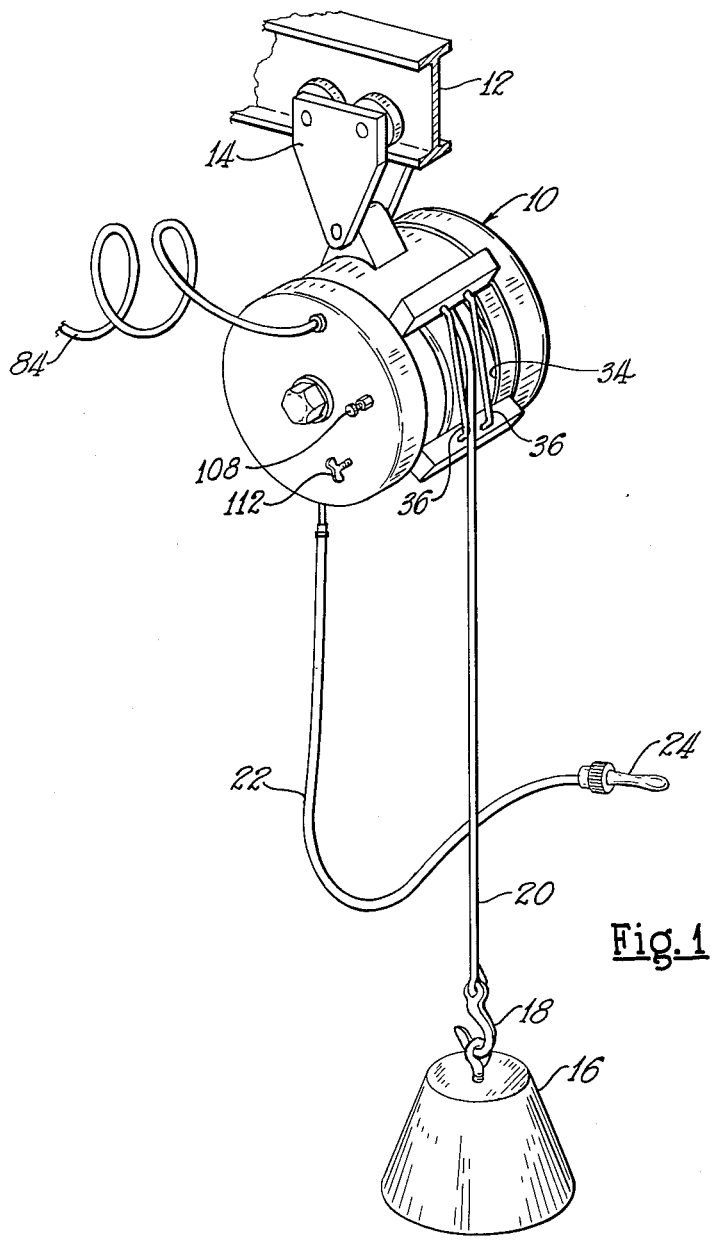
Fig.1
INVENTOR.
EDGAR R. POWELL
BY
ATTORNEYS

INVENTOR.
EDGAR R. POWELL
BY
ATTORNEYS

July 12, 1966   E. R. POWELL   3,260,508
BALANCING HOIST
Filed Oct. 14, 1963   5 Sheets-Sheet 3
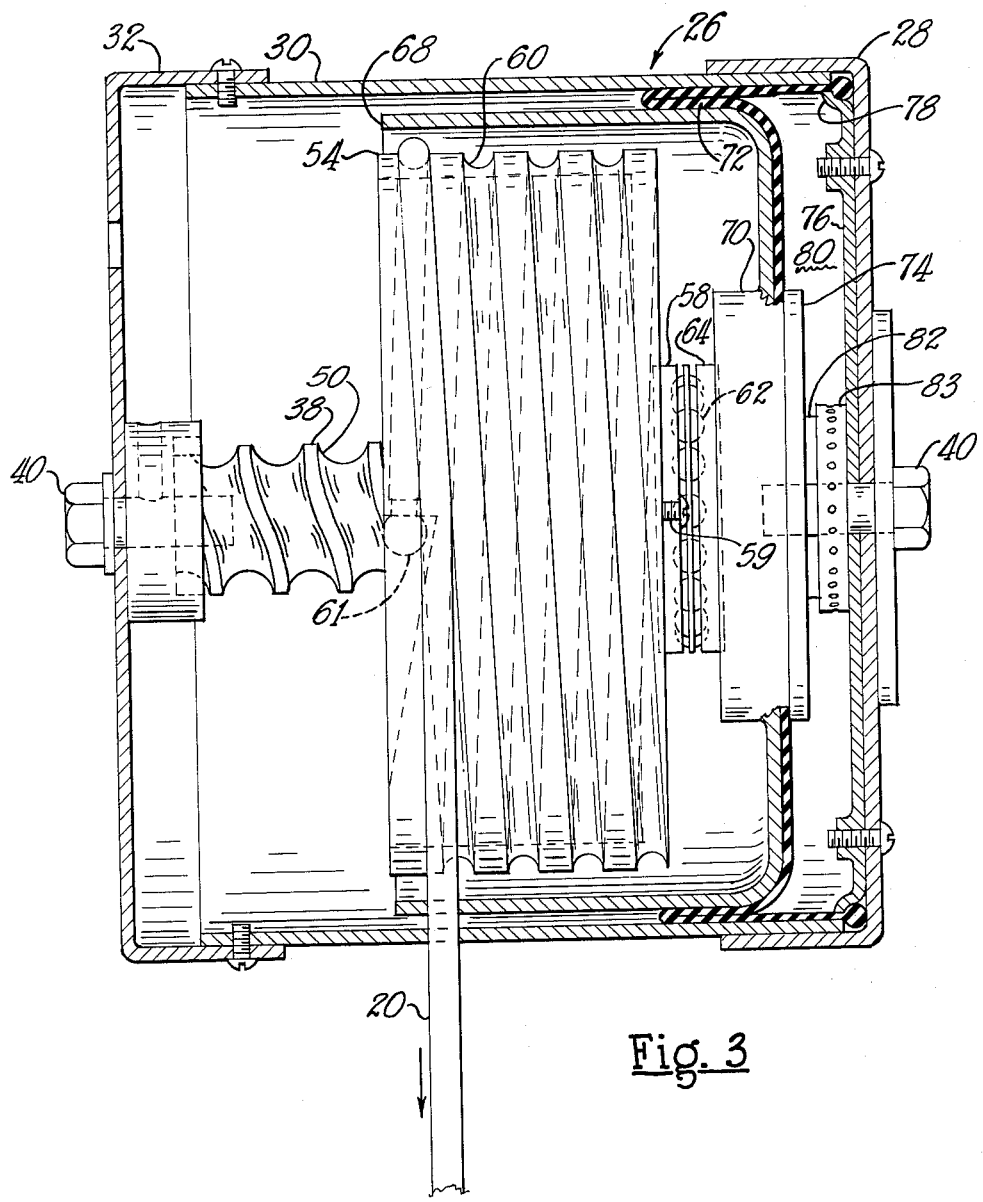
Fig. 3
INVENTOR.
EDGAR R. POWELL
BY 
ATTORNEYS July 12, 1966 E. R. POWELL 3,260,508
BALANCING HOIST Filed Oct. 14, 1963 5 Sheets-Sheet 4

INVENTOR.
EDGAR R. POWELL
BY
ATTORNEYS

July 12, 1966  E. R. POWELL  3,260,508
BALANCING HOIST

Filed Oct. 14, 1963  5 Sheets-Sheet 5

INVENTOR.
EDGAR R. POWELL
BY
ATTORNEYS

United States Patent Office 3,260,508
Patented July 12, 1966

3,260,508
BALANCING HOIST
Edgar R. Powell, Detroit, Mich.
(4833 Elmhurst, Royal Oak, Mich.)
Filed Oct. 14, 1963, Ser. No. 315,873
18 Claims. (Cl. 254—168)

This invention relates to a hoist for transporting heavy loads from one location to another and more particularly to a balancing hoist which relieves most of the weight of the load to enable an operator to manually move a heavy load between locations.

A balancing hoist according to the invention includes a chamber or cylinder containing a fluid, usually air, under pressure, with the air being compressed as a load carried by the hoist is lowered and with the air being allowed to expand as the load is raised. With this arrangement, part of the load is offset or balanced by the air pressure when the load is raised or lowered or remains stationary. By regulating the pressure of the air in the hoist chamber, a load of almost any size can be handled with ease. Since a product or load of a particular size and weight is usually handled by the hoist, being transferred from one conveyor to another, for example, the pressure in the cylinder can be regulated to balance that load so that no further adjustment is required. The pressure is preferably set so that a small force is required to raise and lower the load with this force usually being from about two percent to about ten percent of the actual weight of the load. The hoist operator can then move the load about, raising and lowering it, as though it weighed but a few pounds. The operator thus exercises and uses the same muscles he otherwise would if carrying a load directly but does so without strain or becoming tired. In addition, even an inexperienced operator has complete control over the load and can move it about rapidly, as compared with the skill and time required with the usual electric hoist in which the load is moved solely by motors which the operator controls, with the load never being touched during the transportation of it, except possibly at the beginning and end when the hoist hook is engaged and released. With the balancing hoist, the operator needs little training and can move a load about faster than even highly-skilled operators using conventional electric hoists, for example.

The new balancing hoist includes an air control device which can be operated remotely from the hoist hook and be independent thereof. The air control device either can be fastened to the hoist hook for convenient operation by the hoist operator or it can equally well be moved to a remote position, even in another room if desired, for complete remote control of the hoist. This particularly has an advantage, for example, in handling radioactive materials and transporting them between locations, with the operator being located in a separate room.

The new balancing hoist also is substantially completely self-contained so that it is more compact and less susceptible to damage. This is brought about in part by the fact that the air supply for the hoist chamber is transmitted through a central hollow member in the housing, which member also rotatably supports the main components of the hoist. By this expedient, a vulnerable external air line is entirely eliminated. The air pressure regulator and controls for the new hoist are also contained completely within the hoist housing for protection from injury.

The air controls for the new hoist enable the hoist to be operated easily and with a minimum amount of air. The controls include a main regulator which is controlled by pilot air rather than by a spring, with the regulator controlling the pressure of air supplied to the hoist chamber, which pressure determines the effective weight of the load being manipulated. The pilot air pressure for the main regulator is controlled by a pilot air regulator and a volume control valve is located between the pilot air regulator and the main regulator to control the supply of pilot air and thereby determine the response time of the hoist. The pilot air chamber within the main regulator is connected with a remote vent control which the hoist operator manipulates. When the pilot air chamber is vented, the pressure drops and the main regulator decreases the pressure of the air supplied to the hoist chamber. By increasing the venting of the pilot air chamber, the pressure is lowered in the hoist cylinder and the hoist will thereby balance or offset less weight. Oppositely, by reducing or eliminating the vent of the pilot air chamber, the pressure in this chamber will build up, thus increasing the air pressure to the hoist chamber, and the hoist will thereby balance or offset a heavier load. When there is no load on the hoist hook, substantially all of the air is vented with only a light pressure maintained in the hoist cylinder to balance the weight of the hook.

A multi-position remote control is used for controlling air pressure in the new balancing hoist, which control enables more than one pressure setting to be established for the hoist where loads or products of several different weights are to be handled. The control includes at least three settings. One setting provides only enough pressure to balance the hook when empty. A second setting provides maximum pressure for the maximum load to be encountered. An intermediate setting establishes pressure for an intermediate load, with this setting venting air at a rate between no venting at maximum load and high venting at no-load.

The air control system of the new balancing hoist also incorporates an air-loaded check valve in the air supply line to the hoist chamber. The check valve automatically closes if the main air pressure fails and thereby maintains air pressure within the hoist chamber. With this expedient, if a load is suspended at the time of pressure failure, the load will still be maintained in position without dropping.

The new hoist has another important advantage. The hoist cable is wound on a cable drum which has a spiral groove to guide the winding and unwinding of the cable. The pitch of this groove is equal to the pitch of a groove of a ball screw used to support and rotate the drum. This enables the point on the drum groove at which the cable winds onto and off of the drum to remain the same in spite of the fact that the cable drum and the screw move transversely of the cable as the drum is rotated. This stationary, transverse position of the cable provides more accurate control over the operation of the hoist hook and in the positioning of it relative to the load, as well as in positioning the load over an unloading position.

It is, therefore, a principal object of the invention to provide a balancing hoist having the features and advantages outlined above.

Other objects and advantages of the invention will be apparent from the following detailed description of a preferred embodiment thereof, reference being made to the accompanying drawings, in which:

FIG. 1 is an overall view in perspective of a balancing hoist according to the invention shown mounted on a rail and carrying a load;

FIG. 3 is a view in cross section similar to FIG. 2 but with certain parts in elevation and with the load in a lower position;

Figure 6:
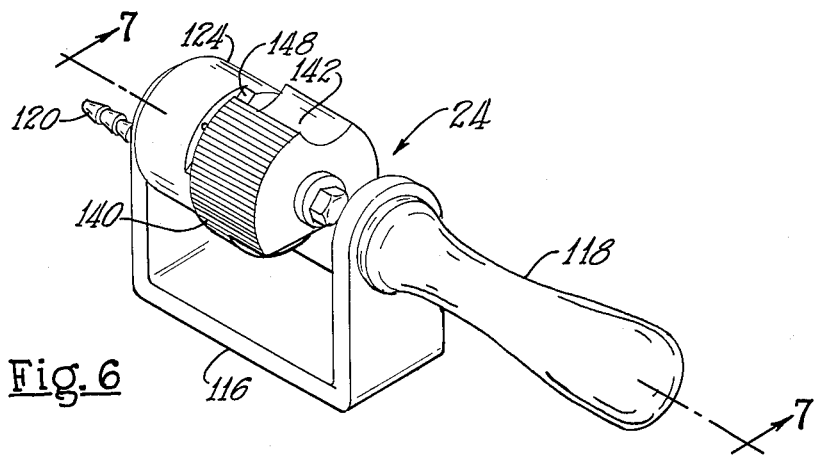
FIG. 6 is a view in perspective of a remote control used with the hoist to control air pressure therein.
Figure 7:
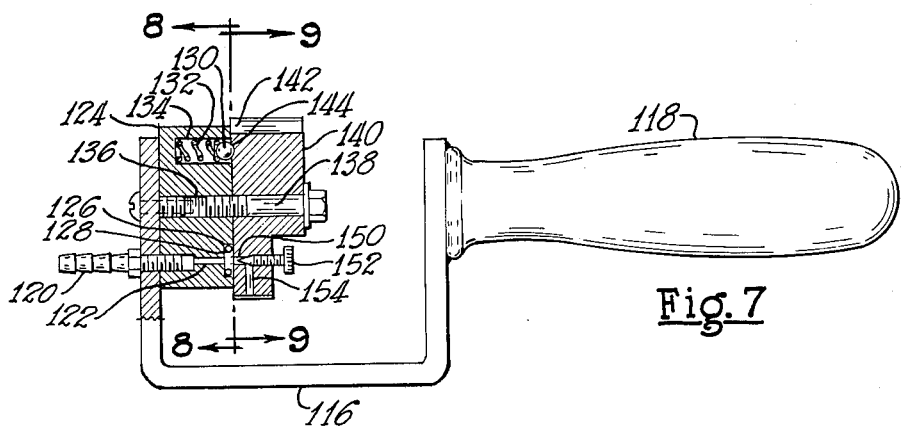
Figure 8:
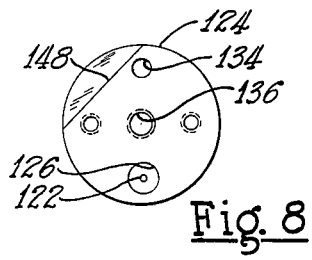
Figure 9:
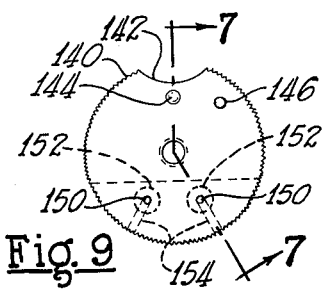

FIG. 7 is a view in longitudinal cross section taken along the lines 7—7 of FIGS. 6 and 9; and FIGS. 8 and 9 are views in transverse cross section taken along the lines 8—8 and 9—9 of FIG. 7.

Referring to the drawings, and more particularly to FIG. 1, a balancing hoist according to the invention is indicated at 10 and is shown suspended from a standard conveyor rail 12 by a suitable trolley 14. A load 16 is suspended from the hoist 10 by a suitable hoist hook 18 and a hoist cable 20. Many types of hooks can be employed with the hoist 10 and the term "hook" as used herein is employed in a broad sense to cover any device for removably connecting a load to the hoist cable 20. Raising and lowering of the load 16 is controlled by a vent or exhaust line 22 and a remote handle control 24. The line 22 and the handle 24 can, if desired, be fastened to the lower end of the cable 20 or the upper end of the load hook 18 to be readily available to the hoist operator, or can be located in a remote position from the load. If it is desired to locate the operator at some distance from the load, such as a radioactive one, by way of example, the line 22 can be lengthened so that the operator can be at substantially any distance from the load, or in another room. In such an instance, the control 24 preferably would have two positions, in one of which the load 16 would be raised and in the other of which it would be lowered. The hoist 10 could then be moved along the conveyor rail 12 by a separate motor or the like.

Figure 2:
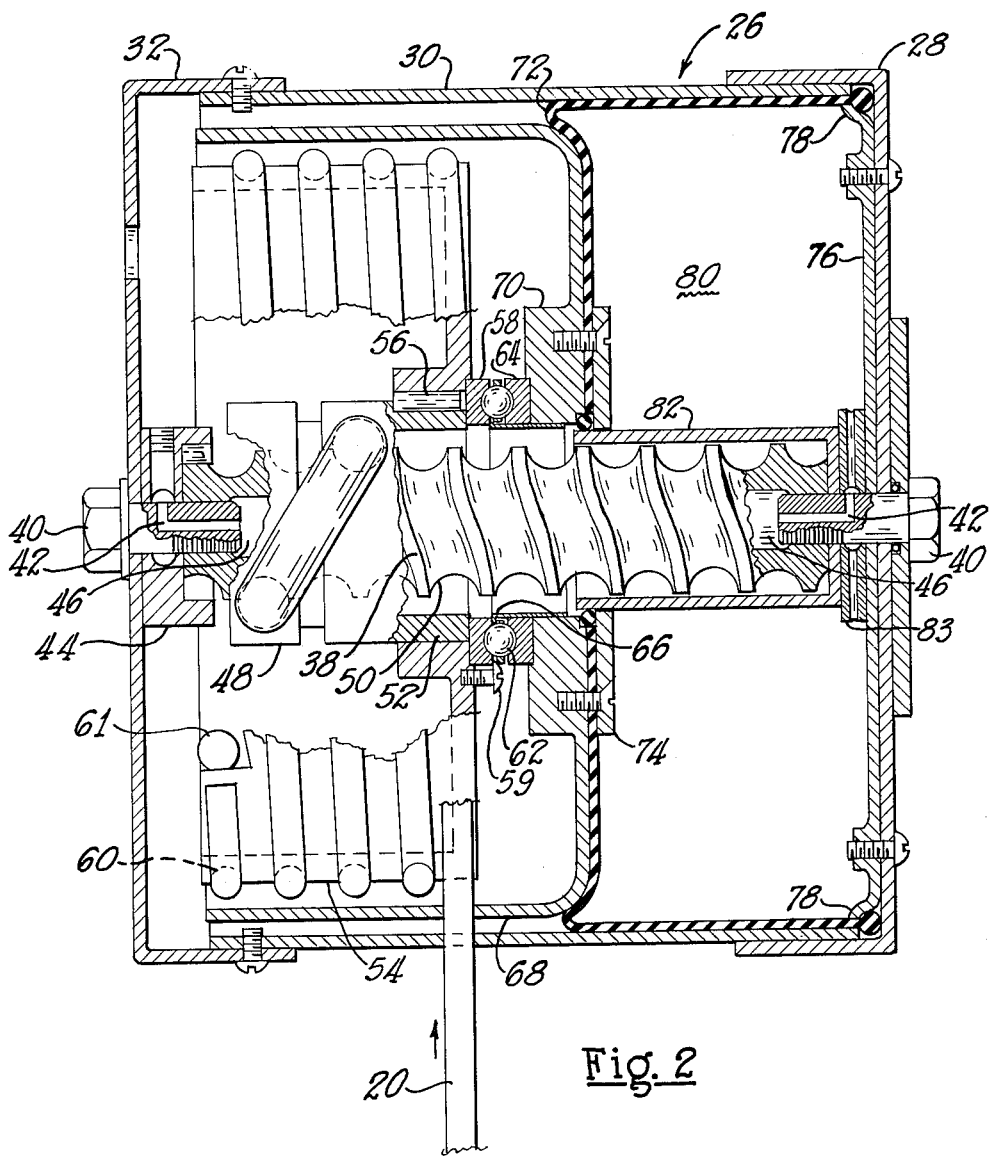
FIG. 2 is a view in vertical, transverse cross section of the hoist shown in FIG. 1, and with the load in an upper position.
Figure 4:
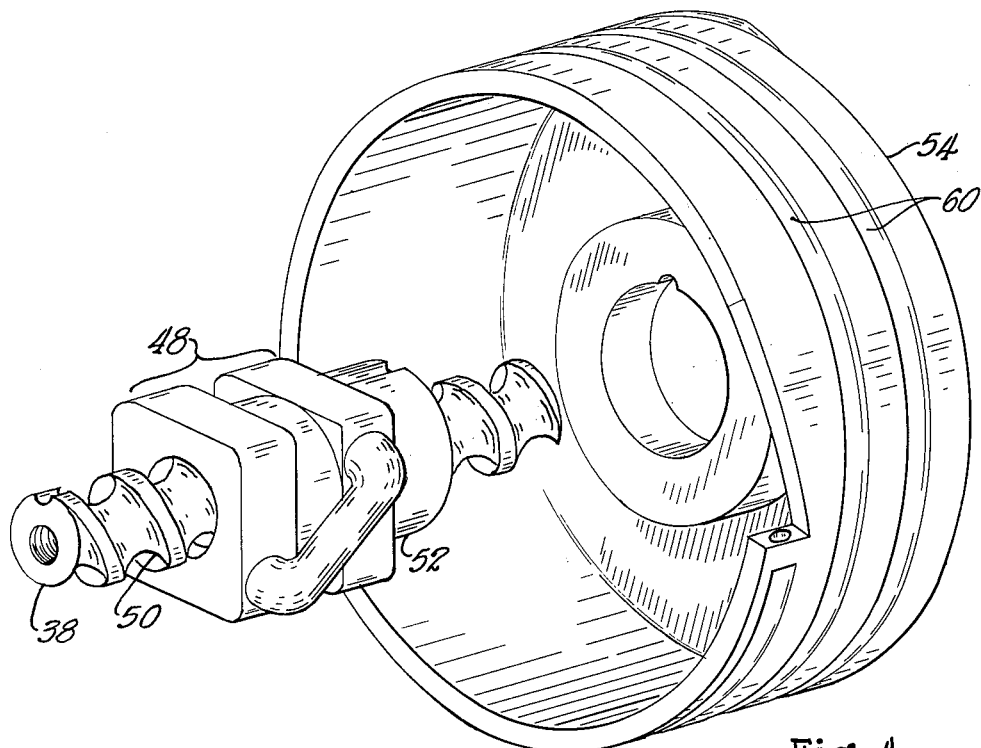
FIG. 4 is a view in perspective of a ball screw and a cable drum mounted thereon.

As shown in FIGS. 2 and 3, the hoist 10 includes a housing 26 which comprises a right end cover 28, a central cylindrical cover 30, and a left end cover 32. The cylindrical cover 30 has a large square opening 34 (FIG. 1) therein through which the hoist cable 20 can pass, with guide bars 36 suitably mounted on the cylindrical cover 30 on each side of the cable 20.

A ball screw 38 (FIGS. 2 and 3) extends between the end covers 28 and 32 of the housing 26 and is affixed to each of the end covers 28 and 32 by machine screws 40 having passages 42 therein. The ball screw 38 also extends into an annular manifold support 44 affixed to a central portion of the end cover 32. The ball screw 38 contains a central passage or bore 46 so that a complete supply passage is established by the screws 40 and the ball screw 38. Thus, the need for an external air line connecting one end of the housing 26 with the other is totally eliminated. This renders the hoist cleaner looking, more compact, and less susceptible to damage.

A ball nut 48 is mounted on the ball screw 38 and is of a type well known in the art and is commercially available, for example, from Saginaw Steering Gear Division of General Motors Corporation. The ball nut 48 contains a plurality of bearing balls which extend partially into a helical groove 50 in the ball screw 38 and move along the groove 50 as the ball nut 48 moves in a helical path along and around the ball screw 38. A drum sleeve 52 is affixed to one end of the ball nut 48 and moves therewith. A hoist cable drum or reel 54 is mounted on the drum sleeve 52 and is connected by a key 56 and a thrust bearing race or ring 58 is held against the end of the drum 54 by screws 59. The hoist drum 54 has a helical cable groove 60 on the surface thereof to receive the hoist cable 20 which is located in the groove 60 around the drum 54 and is affixed at one side of the drum 54 by a metal anchor 61.

The ball nut 48, the drum sleeve 52, and the drum 54 rotate as a unit around the stationary ball screw 38. When the movement is provided by a force or load on the hoist cable 20, the drum 54, the sleeve 52, and the ball nut 48 move toward the right along the ball screw 38. On the other hand, when a thrust force is applied against the thrust bearing race 58, which is greater than the force on the hoist cable 20, the ball nut 48, the sleeve 52, and the drum 54 move toward the left along the ball screw 38.

Each time the drum 54 the sleeve 52, and the ball nut 48 make one revolution, they move a distance along the ball screw 38 equal to the pitch of the helical groove 50 thereon. Ordinarily, the point at which the hoist cable 20 moves onto or off of the drum 54 would also move transversely of the cable a distance equal to the pitch of the helical groove 50. This would also move the load 16 carried by the cable 20 a horizontal distance equal to the pitch of the groove 50 and this would throw off the positioning of the load which, in some instances, is quite critical. It has been discovered that this can be overcome, however, by turning the helical cable groove 60 in the drum 54 in the same direction as the groove 50 and preferably using the same pitch as the ball screw groove 50. Hence, when the drum 54 rotates in a direction to wind the cable 20 thereon and moves one full revolution, the ball nut 48 will move a distance toward the left on the ball screw 38 equal to the pitch of the groove 50. At the same time, however, the cable will wind one revolution in the groove 60 toward the right on the drum 54 and, hence, will move onto the drum at the same point transversely of the cable. Thus, with the ball screw groove 50 and the cable groove 60 turning in a common direction, the problem of transverse motion of the cable 20 is largely overcome, and by making the pitch of the two grooves exactly equal, the transverse movement is entirely offset.

Beyond the drum 54 and the thrust ring 58 is a thrust bearing race and balls 62 and a second thrust bearing race or ring 64 mounted on a sleeve 66 around the ball screw 38. A cable guide and retaining guard 68 is located around the drum 54 and has a thrust plate 70 which abuts the thrust ring 64 and which receives the sleeve 66 by a friction fit. A flexible cup diaphragm 72 is affixed to the thrust plate 70 by means of a mounting plate 74 with an annular edge head of the diaphragm 72 affixed at the end of the housing 26 by an end wall 76, by means of an inturned flange 78. An air chamber or cylinder 80 thereby is formed by the diaphragm 72 and the end wall 76. The diaphragm 72 and the mounting plate 74 are slidable along a bearing sleeve 82 on the ball screw 38 while the end wall 76 is fastened to the cover 28. The sleeve 82 has a closed end held by the screw 40 between the ball screw 38 and a spacer 83. The spacer 83 provides room for the flow of air from the screw passage 42 to the chamber 80.

In operation of the basic hoist, when power fluid such as air is supplied from the manifold 44 through the left end screw 40, the passage 46 in the ball screw 38, the right end screw 40 and past the spacer 83, it enters the chamber 80 and establishes a force on the diaphragm 72 against the thrust plate 70. This force is transmitted through the thrust bearing 58, 62, and 64 to the drum sleeve 52. The drum sleeve 52 transmits the force to the ball nut 48 but neither can move unless the drum 54 is rotated therewith in a direction which tends to wind the hoist cable 20 onto the drum 54. This rotation is opposed by the load 16 on the cable 20 which tends to rotate the drum 54 in the opposite direction and thus urges the drum toward the right. When these forces are equal, the effective weight of the load 16 will be zero and the load can be manually raised and lowered by substantially no force at all, only that necessary to overcome friction. Of course, if the force exerted by the air exceeds that exerted on the cable 20 by the load 16, the ball nut 48, the sleeve 52, and the drum 54 will move toward the left on the ball screw 38 and cause the drum to rotate in a manner to wind up the cable 20 and raise the load 16. On the other hand, if the force of the air in the chamber 80 is less than that exerted by the load, the load will cause the cable 20 to unwind and rotate the drum 54 in a direction such that the ball nut 48 and the sleeve 52 will move toward the right. This moves the thrust plate 70 toward the right to reduce the size of the chamber 80, thereby forcing the air back through the ball screw passage 46. The pressure of the air in the chamber 80 is usually regulated so that the load 16 has an effective weight of only a few pounds. In such an instance, it can be picked up, moved, and laid down in substantially the same manner as an object which does have an actual weight of a few pounds.

Figure 5:
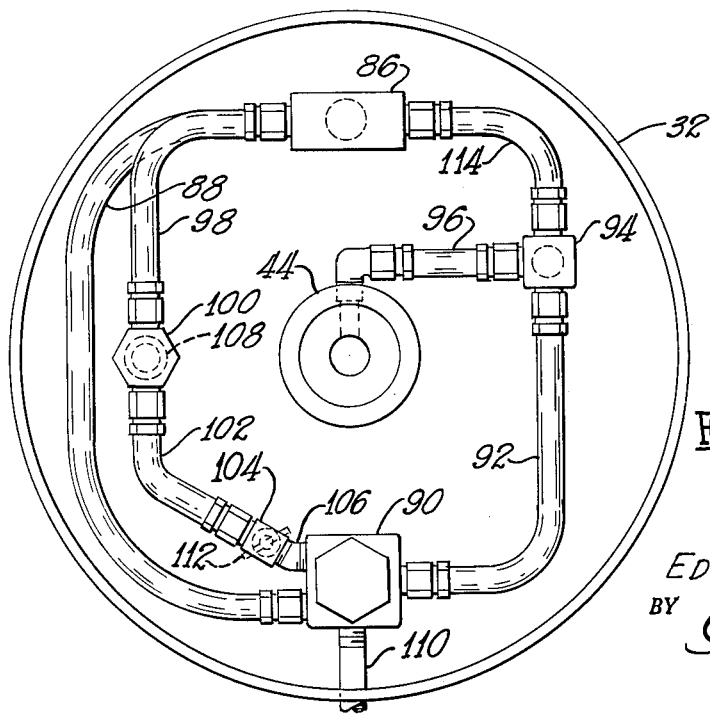
FIG. 5 is a view in elevation of the inside of an end cover of the hoist housing and showing the air control system of the hoist.

The air supply system is shown more specifically in FIG. 5. All of the air supply components are mounted within the hoist housing 26 for compactness and protection. The only external items are control knobs, the vent line 22, and an air supply line 84 (FIG. 1) which is coiled so that it can move along the rail 12 with the hoist 10 without slack or snarling. The air supply line 84 is connected to a suitable source of pressure and supplies air to a supply manifold 86 (FIG. 5) affixed to the end cover 32, with a branch supply line 88 supplying air to a main air regulator 90. The regulator 90 is pilot air-controlled and is of the self-relieving type, bleeding off any air at excess pressure downstream of the regulator. Such a regulator is commercially available, for example, from Fairchild Stratos Corporation of Bay Shore, Long Island, New York, with this regulator being modified for a vent line, as will be discussed subsequently. The regulator 90 supplies air at a given pressure through a line 92, an air control check valve 94, and a line 96 to the annular manifold 44 from which the air passes through the screw passage 42 and the ball screw passage 46 to the chamber 80 at the desired pressure.

The pressure as set by the main regulator 90 is determined by pilot air supplied to it through a first pilot air line 98, a pilot air regulator 100, a second pilot air line 102, a flow control valve 104, and a third pilot air line 106. The pressure set by the pilot air regulator 100 can be controlled by an external adjusting knob 108 (FIGS. 1 and 5). The pilot air acts in the same manner as a spring in a more conventional type of regulator and controls the pressure downstream of the regulator 90 according to the pilot air pressure. This pilot air is supplied to a separate chamber or bonnet in the regulator 90 with which the vent line 22 also communicates by means of a nipple 110 extending through the end cover 32. When this regulator chamber is vented by the control 24, the pilot air pressure therein supplied through the pilot air regulator 100 drops, so that the downstream pressure in the line 92 also correspondingly drops. If the control 24 is shut off entirely so that the pilot air is not vented at all, the supply air downstream of the regulator 90 reaches its full pressure as determined by the pilot air regulator 100.

The volume control valve 104 has a valve stem and handle 112 extending through the end cover 32 in order to adjust the flow of pilot air through the lines 102 and 106. The purpose of the volume control valve 104 is to regulate the response of the hoist 10. Thus, when the vent control 24 is changed from one setting to another, for example from a no-load condition, with the air chamber of the regulator 90 substantially fully vented so that pressure in the air chamber 80 is at a minimum, to a loaded condition, with the hook 18 engaged with the load 16 and the chamber of the regulator 90 not vented at all, the air pressure will begin to push the ball nut 48 and the drum 54 toward the left and tend to wind the cable 20. If the volume control valve 104 is opened fully, the pilot air from the regulator 100 will quickly fill the main regulator pilot chamber and the main regulator 90 will quickly cause full pressure to be supplied to the chamber 80. On the other hand, if the volume control valve 104 is partially closed it will take longer for the pilot air to fill the chamber of the regulator 90 and more time for the full pressure to be reached in the chamber 80. In that instance, the pull on the hook 18 will be slower. A slow response is desired when fragile, elongate, or cumbersome loads are moved. A slow response is also desirable when an operator is being trained.

If the main air pressure should fail, the pilot air pressure will drop to zero which will cause the pressure output of the main regulator to fall to zero. In such an instance, the pressurized air in the hoist chamber 80 will bleed out through the regulator 90 and also drop to zero. If the load 16 is carried in a raised position by the hook 18 at this time, it will drop to the ground rapidly enough to injure or damage anything or anyone in its way. To overcome this, the air control check valve 94 is employed between the lines 92 and 96 and particularly between the main regulator 90 and the air chamber 80. The check valve 94 is supplied control air from the manifold 86 through a line 114 and, as long as it receives this air, remains open to provide unrestricted communication between the lines 92 and 96. If the pressure should fail, the air through the line 114 will drop and the check valve 94 will immediately close. This will trap the air in the hoist chamber 80 and prevent it from bleeding through the regulator 90. Hence, any load in a raised position will remain in that position and cannot drop until the check valve 94 again is opened so that the air in the chamber can bleed back through the regulator 90 as the load is lowered.

The vent or exhaust control 24 is shown in more detail in FIGS. 6–9. While the control can be in a number of forms, the one shown is desirable because it enables several hoist pressures to be controlled by the hoist operator with one hand. The control 24 includes a U-shaped bracket 116 having a handle 118 affixed thereto and a connector 120 which is inserted in the vent line 22. The connector 120 communicates with a vent passage 122 in a stationary member 124 affixed to the bracket 116 with the passage 122 terminating at an annular groove 126 containing an O-ring 128. The stationary member 124 also includes a detent in the form of a ball 130 urged outwardly by a spring 132 located in a bore 134. In addition, the member 124 has a centrally-located threaded hole 136 to receive a pivot screw 138 holding a rotatable member 140.

The member 140 has a notch 142 which enables it to be manipulated easily by the thumb of an operator among three positions. The first or central position of the member 140 is determined by a detent recess 144 which receives the detent ball 130 and centrally locates the rotatable member 140. The other two positions of the member 140 are located on each side of the central one and are determined by a pin 146 which contacts the bottom of a diagonal offset 148 in the stationary member 124.

In the central or full-load position of the rotatable member 140, as determined by the ball 130 and the recess 144, the vent passage 122 in the stationary member 124 is completely blocked off so that the regulator 90 is not vented at all. When the rotatable member 140, on the other hand, is moved to one of the side positions, it aligns one of two additional vent passages 150 with the stationary passage 122 to enable air to be bled or vented through the line 22. The amount of air which is exhausted is determined by needle valve screws 152 which, depending upon their positions, partially block the passages 150 and restrict their communication with branch vent passages 154.

In one of the two side or extreme positions of the rotatable member 140, the needle valve screw 152 is turned outwardly a substantial distance to minimize obstruction between the vent passages 150 and 154 so that substantially full venting can be obtained through the vent line 22. In this position, the air pressure in the chamber 80 is designed to be just sufficient to overcome the weight of the hook 18, some of the larger and more complex of which can be quite heavy.

In the other side position of the rotatable member 140, the needle valve screw 152 is turned inwardly more to restrict the venting and enable the pressure set by the regulator 90 to be somewhere between the full load and the no-load pressure. The exact position is determined by the weight of an intermediate load which the hoist is expected to handle from time to time.

As previously discussed, the control 24 can be used in a remote location or it can be welded or otherwise suitably affixed to the hoist hook 18. In the latter instance, the handle 118 can also be used to manipulate the load 16 held by the hook 18.

Various modifications of the above described embodiment of the invention will be apparent to those skilled in the art and it is to be understood that such modifications can be made without departing from the scope of the invention, if they are within the spirit and the tenor of the accompanying claims.

What I claim is:

1. In a balancing hoist comprising a hoist housing including a cylindrical wall having a side opening therein and a pair of end covers; a ball screw in said housing held by supports on said end covers, said ball screw having a helical groove thereon; a ball nut supported on said screw and capable of moving axially and circumferentially thereon; a cable drum functionally integral with said ball nut and having a helical groove to receive a cable; means in said housing movable toward said cable drum and establishing an air chamber to one side of said drum in said housing; said ball screw, said ball nut, and said drum being arranged to wind the cable on said drum when said air chamber means receives air at sufficient pressure to move said drum along said ball screw in a direction away from the air chamber; said ball screw, said ball nut, and said drum being arranged to unwind the cable from said drum when the air pressure in said air chamber means decreases sufficiently to enable said drum to move along said screw in a direction toward the air chamber; the improvement comprising a pilot air-controlled regulator in said housing mounted on an end cover thereof; passage means connecting said regulator and said air chamber, said passage means including a bore extending longitudinally through said ball screw, and means comprising means in said end cover supports for said ball screw connecting one end of said bore with the air chamber and connecting the other end of said bore with said regulator; a pilot air regulator; a line connecting said pilot air regulator and said pilot air-controlled regulator for supplying pilot air to said pilot air-controlled regulator; a flow control valve between said pilot air regulator and said pilot air-controlled regulator for controlling the volume of pilot air supplied to said pilot air-controlled regulator; an air-controlled check valve in said passage means between said pilot air-controlled regulator and said air chamber; means for supplying air to said check valve; a vent line communicating directly with said pilot air-controlled regulator independently of said drum and extending away from said housing; and a vent control connected to said vent line, said vent control including a movable body having at least three positions selectively connected to said vent line, said control substantially blocking said vent line in one position, said control leaving said vent line substantially unobstructed in a second position, and said control partially obstructing said vent line in a third position, whereby air at three different pressures can be applied to said air chamber through said pilot air-controlled regulator.

2. In a balancing hoist comprising a hoist housing including a cylindrical wall having a side opening therein and a pair of end covers; a ball screw in said housing held by supports on said end covers, said ball screw having a helical groove thereon; a ball nut supported on said screw and capable of moving axially and circumferentially thereon; a cable drum functionally integral with said ball nut and having a helical groove to receive a cable; means in said housing movable toward said cable drum and establishing an air chamber to one side of said drum in said housing; said ball screw, said ball nut, and said drum being arranged to wind the cable on said drum when said air chamber means receives air at sufficient pressure to move said drum along said ball screw in a direction away from the air chamber; said ball screw, said ball nut, and said drum being arranged to unwind the cable from said drum when the air pressure in said air chamber means decreases sufficiently to enable said drum to move along said screw in a direction toward the air chamber; the improvement comprising a pilot air-controlled regulator in said housing mounted on an end cover thereof; passage means connecting said regulator and said air chamber, said passage means including a bore extending longitudinaly through said ball screw, and means comprising means in said end cover supports for said ball screw connecting one end of said bore with the air chamber and connecting the other end of said bore with said regulator; a pilot air regulator; a line connecting said pilot air regulator and said pilot air-controlled regulator for supplying pilot air to said pilot air-controlled regulator; a flow control valve between said pilot air regulator and said pilot air-controlled regulator for controlling the volume of pilot air supplied to said pilot air-controlled regulator; an air-controlled check valve in said passage means between said pilot air-controlled regulator and said air chamber; means for supplying air to said check valve; a vent line communicating directly with said pilot air-controlled regulator independently of said drum and extending away from said housing; and a vent control connected to said vent line.

3. In a balancing hoist comprising a hoist housing including a cylindrical wall having a side opening therein and a pair of end covers; a ball screw in said housing held by supports on said end covers, said ball screw having a helical groove thereon; a ball nut supported on said screw and capable of moving axially and circumferentially thereon; a cable drum functionally integral with said ball nut and having a helical groove to receive a cable, said groove turning in the same direction as said ball screw groove; means in said housing movable toward said cable drum and establishing an air chamber to one side of said drum in said housing; said ball screw, said ball nut, and said drum being arranged to wind the cable on said drum when said air chamber means receives air at sufficient pressure to move said drum along said ball screw in a direction away from the air chamber; said ball screw, said ball nut, and said drum being arranged to unwind the cable from said drum when the air pressure in said air chamber means decreases sufficiently to enable said drum to move along said screw in a direction toward the air chamber; the improvement comprising a pilot air-controlled regulator in said housing; passage means connecting said regulator and said air chamber, said passage means including a bore extending longitudinally through said ball screw, and means comprising means in said end cover supports for said ball screw connecting one end of said bore with the air chamber and connecting the other end of said bore with said regulator; a pilot air regulator; a line connecting said pilot air regulator and said pilot air-controlled regulator for supplying pilot air to said pilot air-controlled regulator; a flow control valve between said pilot air regulator and said pilot air-controlled regulator for controlling the volume of pilot air supplied to said pilot air-controlled regulator; a vent line communicating directly with said pilot air-controlled regulator independently of said drum and extending away from said housing; and a vent control connected to said vent line.

4. In a balancing hoist comprising a hoist housing including a cylindrical wall having a side opening therein and a pair of end covers; a ball screw in said housing held by supports on said end covers, said ball screw having a helical groove thereon; a ball nut supported on said screw and capable of moving axially and circumferentially thereon; a cable drum functionally integral with said ball nut and having a helical groove to receive a cable, said groove turning in the same direction as said ball screw groove; means in said housing movable toward said cable drum and establishing an air chamber to one side of said drum in said housing; said ball screw, said ball nut, and said drum being arranged to wind the cable on said drum when said air chamber means receives air at sufficient pressure to move said drum along said ball screw in a direction away from the air chamber; said ball screw, said ball nut, and said drum being arranged to unwind the cable from said drum when the air pressure in said air chamber means decreases sufficiently to enable said drum to move along said screw in a direction toward the air chamber; the improvement comprising a pilot air-controlled regulator in said housing; passage means connecting said regulator and said air chamber; a pilot air regulator; a line connecting said pilot air regulator and said pilot air-controlled regulator for supplying pilot air to said pilot air-controlled regulator; a flow control valve between said pilot air regulator and said pilot air-controlled regulator for controlling the volume of pilot air supplied to said pilot air-controlled regulator; an air-controlled check valve in said passage means between said pilot air-controlled regulator and said air chamber; means for supplying air to said check valve; a vent line communicating directly with said pilot air-controlled regulator independently of said drum and extending away from said housing; and a vent control connected to said vent line.

5. In a balancing hoist comprising a hoist housing including a cylindrical wall having a side opening therein and a pair of end covers; a ball screw in said housing held by supports on said end covers, said ball screw having a helical groove thereon; a ball nut supported on said screw and capable of moving axially and circumferentially thereon; a cable drum functionally integral with said ball nut and having a helical groove to receive a cable, said groove turning in the same direction as said ball screw groove; means in said housing movable toward said cable drum and establishing an air chamber to one side of said drum in said housing; said ball screw, said ball nut, and said drum being arranged to wind the cable on said drum when said air chamber means receives air at sufficient pressure to move said drum along said ball screw in a direction away from the air chamber; said ball screw, said ball nut, and said drum being arranged to unwind the cable from said drum when the air pressure in said air chamber means decreases sufficiently to enable said drum to move along said screw in a direction toward the air chamber; the improvement comprising a pilot air-controlled regulator in said housing; passage means connecting said regulator and said air chamber; a pilot air regulator, a line connecting said pilot air regulator and said pilot air-controlled regulator for supplying pilot air to said pilot air-controlled regulator; a flow control valve between said pilot air regulator and said pilot air-controlled regulator for controlling the volume of pilot air supplied to said pilot air-controlled regulator; a vent line communicating directly with said pilot air-controlled regulator independently of said drum and extending away from said housing; and a vent control connected to said vent line, said vent control including a movable body having three positions selectively connected to said vent line, said control substantially blocking said vent line in one position, said control leaving said vent line substantially unobstructed in a second position, and said control partially obstructing said vent line in a third position, whereby air at three different pressures can be applied to said air chamber through said pilot air-controlled regulator.

6. In a balancing hoist comprising a hoist housing including a cylindrical wall having a side opening therein and a pair of end covers; a ball screw in said housing held by supports on said end covers, said ball screw having a helical groove thereon; a ball nut supported on said screw and capable of moving axially and circumferentially thereon; a cable drum functionally integral with said ball nut and having a helical groove to receive a cable, said groove turning in the same direction as said ball screw groove; means in said housing movable toward said cable drum and establishing an air chamber to one side of said drum in said housing; said ball screw, said ball nut, and said drum being arranged to wind the cable on said drum when said air chamber means receives air at sufficient pressure to move said drum along said ball screw in a direction away from the air chamber; said ball screw, said ball nut, and said drum being arranged to unwind the cable from said drum when the air pressure in said air chamber means decreases sufficiently to enable said drum to move along said screw in a direction toward the air chamber; the improvement comprising a pilot air-controlled regulator in said housing; passage means connecting said regulator and said air chamber; a pilot air regulator; a line connecting said pilot air regulator and said pilot air-controlled regulator for supplying pilot air to said pilot air-controlled regulator; a vent line communicating directly with said pilot air-controlled regulator independently of said drum and extending away from said housing; and a vent control connected to said vent line.

7. In a balancing hoist comprising a hoist housing including a cylindrical wall having a side opening therein and a pair of end covers; a ball screw in said housing held by supports on said end covers, said ball screw having a helical groove thereon; a ball nut supported on said screw and capable of moving axially and circumferentially thereon; a cable drum functionally integral with said ball nut and having a helical groove to receive a cable, said groove turning in the same direction as said ball screw groove; means in said housing movable toward said cable drum and establishing an air chamber to one side of said drum in said housing; said ball screw, said ball nut, and said drum being arranged to wind the cable on said drum when said air chamber means receives air at sufficient pressure to move said drum along said ball screw in a direction away from the air chamber; said ball screw, said ball nut, and said drum being arranged to unwind the cable from said drum when the air pressure in said air chamber means decreases sufficiently to enable said drum to move along said screw in a direction toward the air chamber; the improvement comprising air-controlled regulator in said housing; passage means connecting said regulator and said air chamber; means for supplying control air to said regulator; a vent line communicating directly with said pilot air-controlled regulator independently of said drum and extending away from said housing; and a vent control connected to said vent line.

8. A balancing hoist comprising a hoist housing; a ball screw in said housing; a ball nut on said ball screw; a cable drum functionally integral with said ball nut and adapted to receive a cable wound thereon; means in said housing movable toward said cable drum and establishing an air chamber near said drum; said nut, said screw, and said drum being arranged to wind the cable on said drum when said movable means moves toward said drum; said nut, said screw, and said drum being arranged to unwind cable from said drum when said drum moves along said screw in a direction toward said moving means; a pilot air-controlled regulator; passage means connecting said regulator and the air chamber; a pilot air regulator for supplying pilot air to said pilot air-controlled regulator; and a flow control valve between said pilot air regulator and said pilot air-controlled regulator for controlling the volume of pilot air supplied to said pilot air-controlled regulator.

9. A balancing hoist comprising a hoist housing; a ball screw in said housing; a ball nut on said ball screw; a cable drum functionally integral with said ball nut and adapted to receive a cable wound thereon; means in said housing movable toward said cable drum and establishing an air chamber near said drum; said nut, said screw, and said drum being arranged to wind the cable on said drum when said movable means moves toward said drum; said nut, said screw, and said drum being arranged to unwind cable from said drum when said drum moves along said screw in a direction toward said moving means; a pilot air-controlled regulator; passage means connecting said regulator and the air chamber; means for supplying pilot air to said pilot air-controlled regulator; a vent line connected directly to said pilot air-controlled regulator and spaced from said cable drum; and means at the other end of said vent line for controlling flow of air therethrough.

10. A balancing hoist comprising a hoist housing, a cable drum mounted in said housing for rotatable and axial movement, means in said houisng for establishing an air chamber for applying pressure to an end of said drum and for moving said drum axially in said housing, said drum being arranged to wind the cable thereon when moved axially in said housing away from the air chamber, said drum being arranged to unwind cable therefrom when moved axially in said housing toward said air chamber, a pilot air-controlled regulator, passage means connecting said regulator and said air chamber, means for supplying pilot air to said pilot air-controlled regulator, a vent line connected directly to said pilot air-controlled regulator and spaced from and independent of said cable drum, and means at the other end of said vent line for controlling the flow of air therethrough.

11. A balancing hoist comprising a hoist housing; a ball screw in said housing; a ball nut on said ball screw; a cable drum functionally integral with said ball nut and adapted to receive a cable wound thereon; means in said housing movable toward said cable drum and establishing an air chamber near said drum; said nut, said screw, and said drum being arranged to wind the cable on said drum when said movable means moves toward said drum; said nut, said screw, and said drum being arranged to unwind cable from said drum when said drum moves along said screw in a direction toward said moving means; a pilot air-controlled regulator; passage means connecting said regulator and the air chamber, said passage means including a bore extending longitudinally through said ball screw, means connecting one end of said ball screw with the air chamber, and means connecting the other end of said screw with said regulator; means for supplying pilot air to said pilot air-controlled regulator; and a vent line connected to said regulator to vent pilot air therefrom.

12. A balancing hoist comprising a hoist housing, a cable drum mounted in said housing for rotatable and axial movement, means in said housing for establishing an air chamber for applying pressure to an end of said drum and for moving said drum axially in said housing, said drum being arranged to wind the cable thereon when moved axially in said housing away from the air chamber, said drum being arranged to unwind cable therefrom when moved axially in said housing toward said air chamber, a pilot air-controlled regulator, passage means connecting said regulator and said air chamber, said passage means including means forming a bore extending longitudinally within said housing through said cable drum, means connecting one end of said bore with said air chamber, means connecting the other end of said bore with said pilot air-controlled regulator, and means for supplying pilot air to said pilot air-controlled regulator.

13. A balancing hoist comprising a hoist housing; a ball screw in said housing; a ball nut on said ball screw; a cable drum functionally integral with said ball nut and adapted to receive a cable wound thereon; means in said housing movable toward said cable drum and establishing an air chamber near said drum; said nut, said screw, and said drum being arranged to wind the cable on said drum when said movable means moves toward said drum; said nut, said screw, and said drum being arranged to unwind cable from said drum when said drum moves along said screw in a direction toward said moving means; a pilot air-controlled regulator; passage means connecting said regulator and the air chamber; and an air-controlled check valve in said passage means.

14. A balancing hoist comprising a hoist housing, a cable drum mounted in said housing for rotatable and axial movement, means in said housing for establishing an air chamber for applying pressure to an end of said drum and for moving said drum axially in said housing, said drum being arranged to wind the cable thereon when moved axially in said housing away from the air chamber, said drum being arranged to unwind cable therefrom when moved axially in said housing toward said air chamber, a pilot air-controlled regulator, passage means connecting said regulator and said air chamber, and an air-controlled check valve in said passage means.

15. A balancing hoist comprising a hoist housing, a cable drum mounted in said housing for rotatable and axial movement, means in said housing for establishing an air chamber for applying pressure to an end of said drum and for moving said drum axially in said housing, said drum being arranged to wind the cable thereon when moved axially in said housing away from the air chamber, said drum being arranged to unwind cable therefrom when moved axially in said housing toward said air chamber, a pilot air-controlled regulator, passage means connecting said regulator and said air chamber, a pilot air regulator for supplying pilot air to said pilot air-controlled regulator, and a flow control valve for controlling the volume of pilot air supplied to said pilot air-controlled regulator.

16. A balancing hoist comprising a hoist housing, a cable drum mounted in said housing for rotatable and axial movement, means in said housing for establishing an air chamber for applying pressure to an end of said drum and for moving said drum axially in said housing, said drum being arranged to wind the cable thereon when moved axially in said housing away from the air chamber, said drum being arranged to unwind cable therefrom when moved axially in said housing toward said air chamber, a pilot air-controlled regulator, passage means connecting said regulator and said air chamber, a pilot air regulator for supplying pilot air to said pilot air-controlled regulator, and an air-controlled check valve in said passage means.

17. A balancing hoist comprising a housing, an elongate supporting member in said housing, a cable drum movably mounted on said elongate member and adapted to rotate when moved axially thereon, air-operated means for moving said drum along said elongate member, a pilot air-controlled regulator to regulate the pressure of air supplied to said moving means, a vent line communicating with said pilot air-controlled regulator and extending away from said housing, and a vent control connected to said vent line, said vent control having at least three positions, said control substantially blocking said vent line in one position, said control leaving said vent line substantially unobstructed in a second position, and said control partially obstructing said vent line in a third position, whereby air at three different pressures can be applied to said moving means through said regulator.

18. A balancing hoist comprising a housing, an elongate supporting member in said housing, a cable drum movably mounted on said elongate member and adapted to rotate when moved axially thereon, air-operated means for moving said drum along said elongate member, a pilot air-controlled regulator to regulate the pressure of air supplied to said moving means, a vent line communicating with said pilot air-controlled regulator and extending away from said housing, and a vent control connected to said vent line, said vent control including a movable body having at least three positions, in each of which said body communicates with said vent line, said vent control substantially blocking said vent line in one position to enable said pilot air-controlled regulator to supply maximum pressure to said chamber, said control substantially unobstructing said vent line in a second position to enable said pilot air-controlled regulator to supply air at substantially minimum pressure to said air chamber, and said vent control partially obstructing said vent line in a third position to enable said pilot air-controlled valve to supply air at an intermediate pressure to said chamber.

References Cited by the Examiner

UNITED STATES PATENTS

| | | | |
|---|---|---|---|
| 1,052,173 | 2/1913 | Reece | 137—625.21 |
| 2,478,494 | 8/1949 | Martin | 137—377 X |
| 2,529,254 | 11/1950 | Ives | 137—377 X |
| 2,710,107 | 6/1955 | Powell | 254—168 X |
| 3,109,615 | 11/1963 | Fritz | 254—150 X |

EVON C. BLUNK, *Primary Examiner.*

SAMUEL F. COLEMAN, *Examiner.*

H. HORNSBY, *Assistant Examiner.*